United States Patent
Fedorkow et al.

(10) Patent No.: US 7,289,434 B2
(45) Date of Patent: Oct. 30, 2007

(54) METHOD FOR VERIFYING FUNCTION OF REDUNDANT STANDBY PACKET FORWARDER

(75) Inventors: Guy C. Fedorkow, Bedford, MA (US); Gary S. Muntz, Lexington, MA (US); Timothy P. Donahue, Natick, MA (US); Michael E. Wildt, Somerville, MA (US)

(73) Assignee: Cisco Technology, Inc., San Jose, CA (US)

( * ) Notice: Subject to any disclaimer, the term of this patent is extended or adjusted under 35 U.S.C. 154(b) by 1076 days.

(21) Appl. No.: 10/310,305

(22) Filed: Dec. 5, 2002

(65) Prior Publication Data

US 2004/0109418 A1 Jun. 10, 2004

(51) Int. Cl.
*H04L 12/26* (2006.01)

(52) U.S. Cl. .......................... 370/219; 370/249; 714/1

(58) Field of Classification Search ................ 370/219, 370/218, 220, 249; 714/1, 2, 3, 4, 10, 11, 714/13
See application file for complete search history.

(56) References Cited

U.S. PATENT DOCUMENTS

| | | | |
|---|---|---|---|
| 4,486,877 A | 12/1984 | Turner | |
| 5,522,046 A | 5/1996 | McMillen et al. | |
| 5,737,338 A | 4/1998 | Eguchi et al. | |
| 5,781,715 A | 7/1998 | Sheu | |
| 5,848,227 A | 12/1998 | Sheu | |
| 5,896,370 A * | 4/1999 | Eckhoff et al. ............. | 370/228 |
| 6,282,678 B1 | 8/2001 | Snay et al. | |
| 6,286,048 B1 | 9/2001 | Moberg | |
| 6,333,931 B1 | 12/2001 | LaPier et al. | |
| 6,373,822 B1 | 4/2002 | Raj et al. | |
| 6,393,486 B1 | 5/2002 | Pelavin et al. | |
| 6,460,146 B1 | 10/2002 | Moberg et al. | |
| 6,466,548 B1 | 10/2002 | Fitzgerald | |
| 6,785,843 B1 * | 8/2004 | McRae et al. ................ | 714/23 |
| 6,948,088 B1 * | 9/2005 | Sharan .......................... | 714/6 |
| 7,065,038 B1 * | 6/2006 | Brandt et al. ............... | 370/219 |

OTHER PUBLICATIONS

U.S. Appl. No. 09/791,603, Rachepalli, et al.
U.S. Appl. No. 09/791,062, Gary S. Muntz.
Cisco 10000 Series Hardware Architecture, Cisco Systems, Inc., http://www.cisco.com, (c) 1992-2002, pp. 1-7.
Cisco 10000 Series Performance Routing Engine Data Sheet, Cisco Systems, Inc., http://www.cisco.com, (c) 1992-2000, pp. 1-6.
"Notification of Transmittal of The International Search REport or the Declaration" for International Application No. PCT/US03/38274, with an international filing date of Mar. 12, 2003.

* cited by examiner

*Primary Examiner*—Min Jung
(74) *Attorney, Agent, or Firm*—Cesari and McKenna LLP

(57) ABSTRACT

In one embodiment, an intermediate node includes one or more active forwarding planes and one or more redundant forwarding planes. The intermediate node may also include one or more active control planes and one or more redundant control planes. A test packet is generated, in some cases by a redundant control plane, and transferred to a redundant forwarding plane. The operational state of the redundant forwarding plane is verified, at least in part, by using operational software and hardware contained in the redundant forwarding plane to forward the test packet from the redundant forwarding plane to a target line card. The target line card loops the test packet back to the redundant forwarding plane as part of the verification process. In some cases, the redundant control plane processes the looped-back test packet.

24 Claims, 11 Drawing Sheets

METHOD FOR VERIFYING FUNCTION OF REDUNDANT STANDBY PACKET FORWARDER

BACKGROUND OF THE INVENTION

1. Field of the Invention

This invention relates generally to computer networks and more specifically to verifying the operation of an intermediate node.

2. Background Information

A computer network is a geographically distributed collection of interconnected communication links and segments for transporting data between nodes, such as computers. Many types of network segments are available, with the types ranging from local area networks (LANs) to wide area networks (WANs). LANs typically connect personal computers and workstations over dedicated, private communications links located in the same general physical location, such as a building or a campus. WANs, on the other hand, typically connect large numbers of geographically dispersed nodes over long-distance communications links, such as common carrier telephone lines. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Computer networks may be further interconnected by an intermediate network node, such as a route, having a plurality of ports that may be coupled to the networks. To interconnect dispersed computer networks and/or provide Internet connectivity, many organizations rely on the infrastructure and facilities of Internet Service Providers (ISPs). ISPs typically own one or more backbone networks that are configured to provide high-speed connections to the Internet. To interconnect geographically dispersed private networks, an organization may subscribe to one or more ISPs and couple each of its private networks to the ISPs' equipment. Here, the router may be utilized to interconnect a plurality of private networks or subscribers to an IP backbone network. Routers typically operate at the network layer of a communications protocol stack, such as the network layer of the TCP/IP communications architecture.

Simple networks may be constructed using general-purpose routers interconnected by links owned or leased by ISPs. As networks become more complex with greater numbers of elements, additional structure may be required. In a complex network, structure can be imposed on routers by assigning specific jobs to particular routers. A common approach for ISP networks is to divide assignments among access routers and backbone routers. An access router provides individual subscribers access to the network by way of large numbers of relatively low-speed ports connected to the subscribers. Backbone routers, on the other hand, provide transports to the backbone network and are configured to provide high forwarding rates on fast interfaces. ISPs may impose further physical structure on their networks by organizing them into points of presence (POP). An ISP network usually consists of a number of POPs, each of which comprises a physical location wherein a set of access and backbone routers is located.

As Internet traffic increases, the demand for access routers to handle increased density and backbone routers to handle greater throughput becomes more important. In this context, increased density denotes a greater number of subscriber ports that can be terminated on a single router. Such requirements can be met most efficiently with platforms designed for specific applications. An example of such a specifically designed platform is an aggregation router. Aggregation routers, or "aggregators," are access routers configured to provide high quality of service (QoS) and guaranteed bandwidth for both data and voice traffic destined for the Internet. Aggregators also provide a high degree of security for such traffic. These functions are considered "high-touch" features that necessitate substantial processing of the traffic by the router.

Notably, aggregators are configured to accommodate increased density by aggregating a large number of leased lines from ISP subscribers onto a few trunk lines coupled to an Internet backbone. Increased density has a number of advantages for an ISP, including conservation of floor space, simplified network management and improved statistical performance of the network. Real estate (i.e., floor space) in a POP is typically expensive and costs associated with floor space may be lowered by reducing the number of racks needed to terminate a large number of subscriber connections. Network management may be simplified by deploying a smaller number of larger routers. Moreover, larger numbers of interfaces on the access router improve the statistical performance of a network. Packet networks are usually designed to take advantage of statistical multiplexing, capitalizing on the fact that not all links are busy all of the time. The use of larger numbers of interfaces reduces the chances that a "fluke" burst of traffic from many sources at once will cause temporary network congestion.

In addition to deployment at a POP, aggregators may be deployed in a telephone company central office. The large numbers of subscribers connected to input interface ports of the aggregator are typically small to medium sized businesses that conduct a substantial portion of their operations "on-line," e.g., over the Internet. Each of these subscribers may connect to a particular aggregator over a high-reliability link connection that is typically leased from, e.g., a telephone company provider. The subscriber traffic received at the input interfaces is funneled onto at least one trunk interface. That is, the aggregator essentially functions as a large "fan-in" device wherein a plurality (e.g., thousands) of relatively low-speed subscriber input links is aggregated onto a single, high-speed output trunk to a backbone network of the Internet.

Failures in access routers may result in the loss of service to hundreds or thousands of subscribers. Thus, it is desirable to configure access routers to provide a high degree of availability in order to minimize the impact associated with failures. Unlike backbone routers, however, providing high availability in an access router can be quite involved. For example, backbone routers often employ specialized routing algorithms to automatically redirect traffic around malfunctioning backbone routers and therefore improve network availability by simply reconfiguring the network to use an alternative (redundant) link. However, this capability is not feasible with an access router. Here, subscriber-to-trunk and trunk-to-subscriber traffic patterns are often predominant, and these patterns may result in the aggregation of hundreds or thousands of dedicated access links at one point, where they are, as noted above, typically funneled into a larger trunk up-link to the backbone network. The cost of providing redundant subscriber links may be prohibitive except for the most extreme circumstances. Thus in access routers, availability is often provided in ways other than redundant links.

One prior technique often used to enhance the availability of access routers involves configuring the router as a redundant system containing two or more complete sets of control and forwarding plane elements where one set of elements is designated "active" and the other sets are designated "standby." The active elements perform the normal control and forwarding plane functions of the router, such as packet processing, routing, and so on. The standby elements, on the other hand, may sit idle or simply loop on software that tests portions of the standby elements and/or monitors the status of the Is active elements. If an active element fails, a "switchover" is initiated which typically involves placing the active elements in a standby state and configuring a set of standby elements to assume the role of the active elements. This configuration may include loading operational firmware and various configuration information into the standby elements to make them active.

To ensure system availability in a redundant system, a standby element must be prepared to assume the role of an active element should a failure or change in configuration make the active element unavailable. A failure of a standby element may affect the availability of that element to assume the role of an active element and therefore affect the overall system availability. To enhance the efficacy of a redundant scheme, lessen the loss of service due to failure of an active element, and enhance availability of the standby elements, it is desirable to continuously verify the function of the standby elements. Ideally, such verification should meet the following requirements:

1) verifying as many functions of the standby element as possible that would be in use if the element were to operate as an active element;

2) not interfere with the operation of the active elements or the overall system; and 3) in order to lessen loss of service that may be experienced in the event of a switchover operation, allow the standby element to begin functioning as an active element as soon as possible.

Prior techniques that employ control and forwarding plane redundancy often do not meet or only partially meet the above requirements. These techniques typically use only hardware redundancy, or do not support ongoing functional verification of the standby forwarding-plane elements, or do not support fast switchover of the elements from the standby role to the active role, or require the system to be offline during standby verification. Moreover, these techniques provide limited assurance that a standby element is prepared to assume the role of an active element. As a consequence, a high degree of system availability using these techniques is often difficult, if not impossible, to achieve.

SUMMARY OF THE INVENTION

The present invention relates to a technique that can be used to improve the availability of an intermediate node having one or more line cards coupled to one or more active and redundant forwarding plane elements and optionally one or more active and redundant control plane elements. Each line card contains cutover logic that is configurable to provide a "loopback" mechanism that enables packets to be looped back to the redundant forwarding plane. The operational state of the redundant elements is verified using this loopback mechanism and operational software and hardware contained in the redundant elements. Moreover, to enhance system availability, verification of the redundant elements is performed in an "online" manner, meaning that the redundant elements are verified while the active elements are passing "live" traffic.

In accordance with the inventive technique, the active and redundant control and forwarding planes are configured to execute operational software and the line cards are configured to loop back packets received from the redundant forwarding plane back to the redundant forwarding plane. Packets are generated and transferred to the redundant forwarding plane. The operational state of the redundant forwarding plane is verified using operational software and hardware contained in the redundant forwarding plane to forward the packets to the line cards. The packets are looped-back at the line cards to the redundant forwarding plane where they are forwarded by the redundant forwarding plane, using the operational software and hardware, to an entity which processes the packet. Optionally, the operational state of the redundant control plane is verified using operational software and hardware contained in the redundant control plane to transfer the packets to the redundant forwarding plane and process looped-back packets transferred from the redundant forwarding plane.

Briefly, in the illustrated embodiment, the intermediate node contains active and redundant (standby) routing engines (REs) coupled to line cards. The standby RE contains forwarding and control plane elements configured to execute operational software and use operational configuration information, such as forwarding table information, acquired from the active RE. Cutover logic in one or more (target) line cards is configured to loop packets received from the standby RE back to the standby RE. A route processor (RP), contained in the control plane of the standby RE, generates a test packet and using operational software transfers it to a forwarding engine (FE) contained in the standby RE's forwarding plane. Using operational software and operational configuration information, the FE processes the test packet including determining the destination (i.e., a target line card) of the packet and forwarding the packet to this destination (i.e., the target line card). The target line card loops the packet back to the standby RE where it is transferred to the FE. The FE using operational software and hardware processes the test packet including forwarding the packet to the RP. Using operational software and hardware, the RP processes the packet including verifying it which may include verifying the contents of the packet, as well as examining status associated with the packet.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
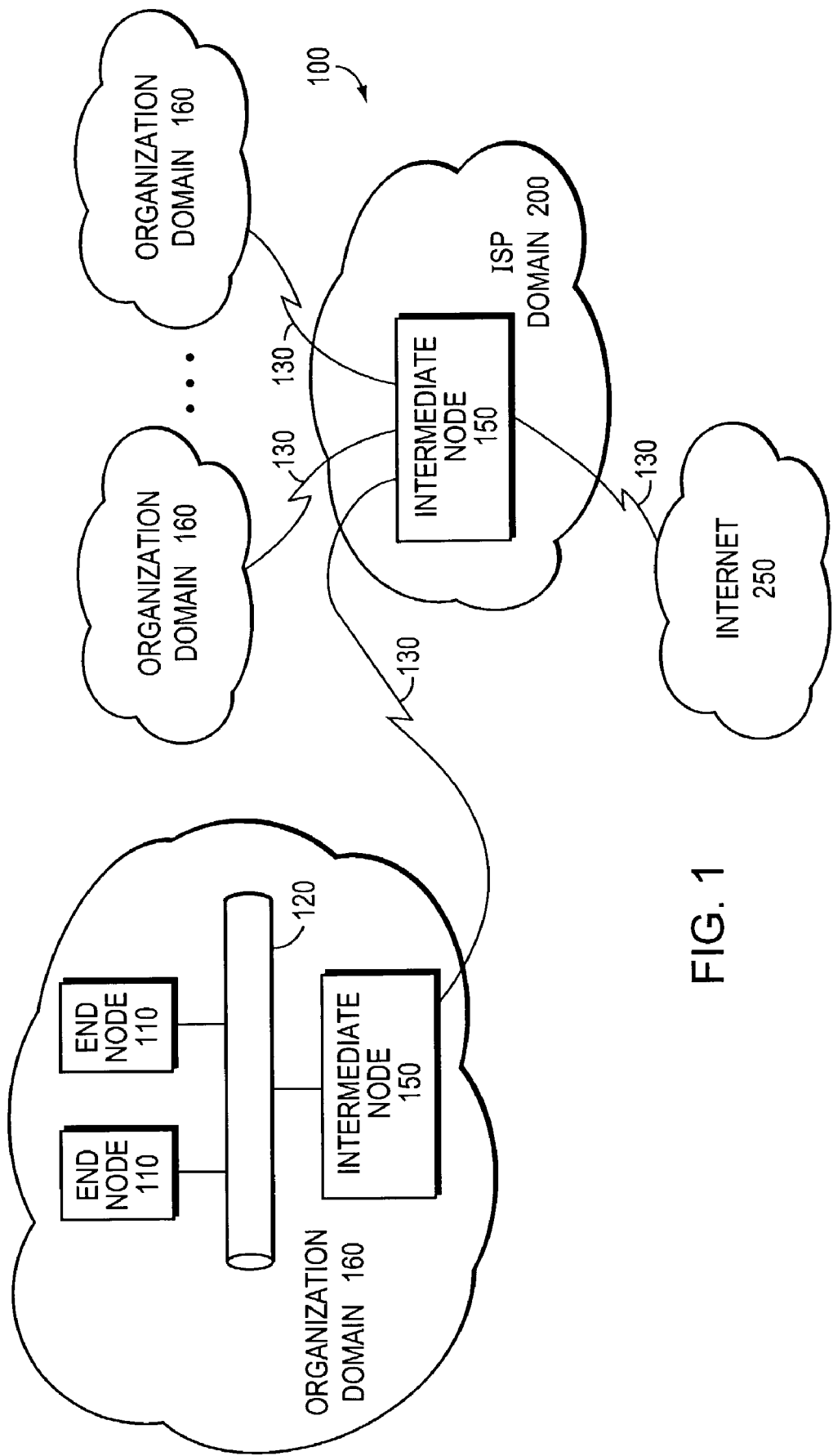
FIG. 1 is a schematic block diagram of a network including a collection of communication links and segments organized into a plurality of subscriber domains coupled to an Internet service provider (ISP) domain.

FIG. 1 is a schematic block diagram of a computer network 100 comprising a collection of communication links and segments connected to a plurality of nodes, such as end nodes 110 and intermediate nodes 150. The network links and segments may comprise local area networks (LANs) 120 and wide area network (WAN) links 130 interconnected by intermediate nodes 150, such as network switches or routers, to form an internetwork of computer nodes. These internetworked nodes communicate by exchanging data packets according to a predefined set of protocols, such as the Transmission Control Protocol/Internet Protocol (TCP/IP).

Figure 2:
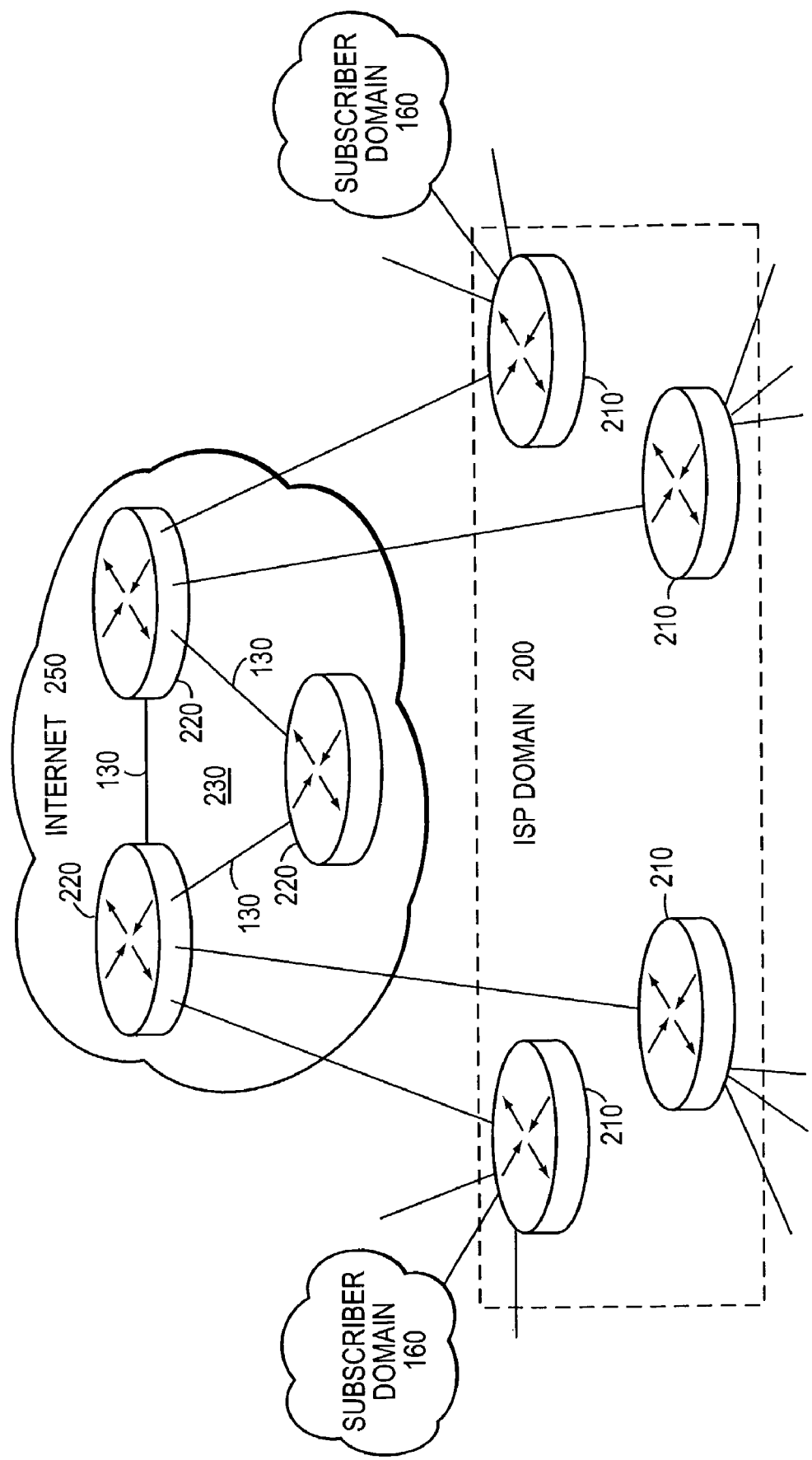
FIG. 2 is a schematic block diagram of an ISP domain comprising a plurality of interconnected access and backbone routers.

To interconnect their dispersed private computer networks and/or provide Internet connectivity, many organizations rely on the infrastructure and facilities of Internet service providers (ISPs) rather than purchase and configure the necessary equipment themselves. In the illustrative embodiment, the computer network 100 is organized into a plurality of domains, including organization domains 160 of private networks coupled to an ISP domain 200. An organization 160 may subscribe to one or more ISPs 200 and couple each of its private networks to the ISP's equipment. FIG. 2 is a schematic block diagram of an ISP domain 200 comprising a plurality of interconnected access and backbone routers 210, 220 that may be advantageously used with the present invention. The access routers 210 connect the individual organization or subscriber domains 160 to the backbone routers 220 via relatively low-speed ports connected to the subscribers. The backbone routers 220 are interconnected by WAN links 130 to form one or more backbone networks 230 configured to provide high-speed, high-capacity, wide-area connectivity to the Internet, represented herein as Internet cloud 250.

Figure 3:
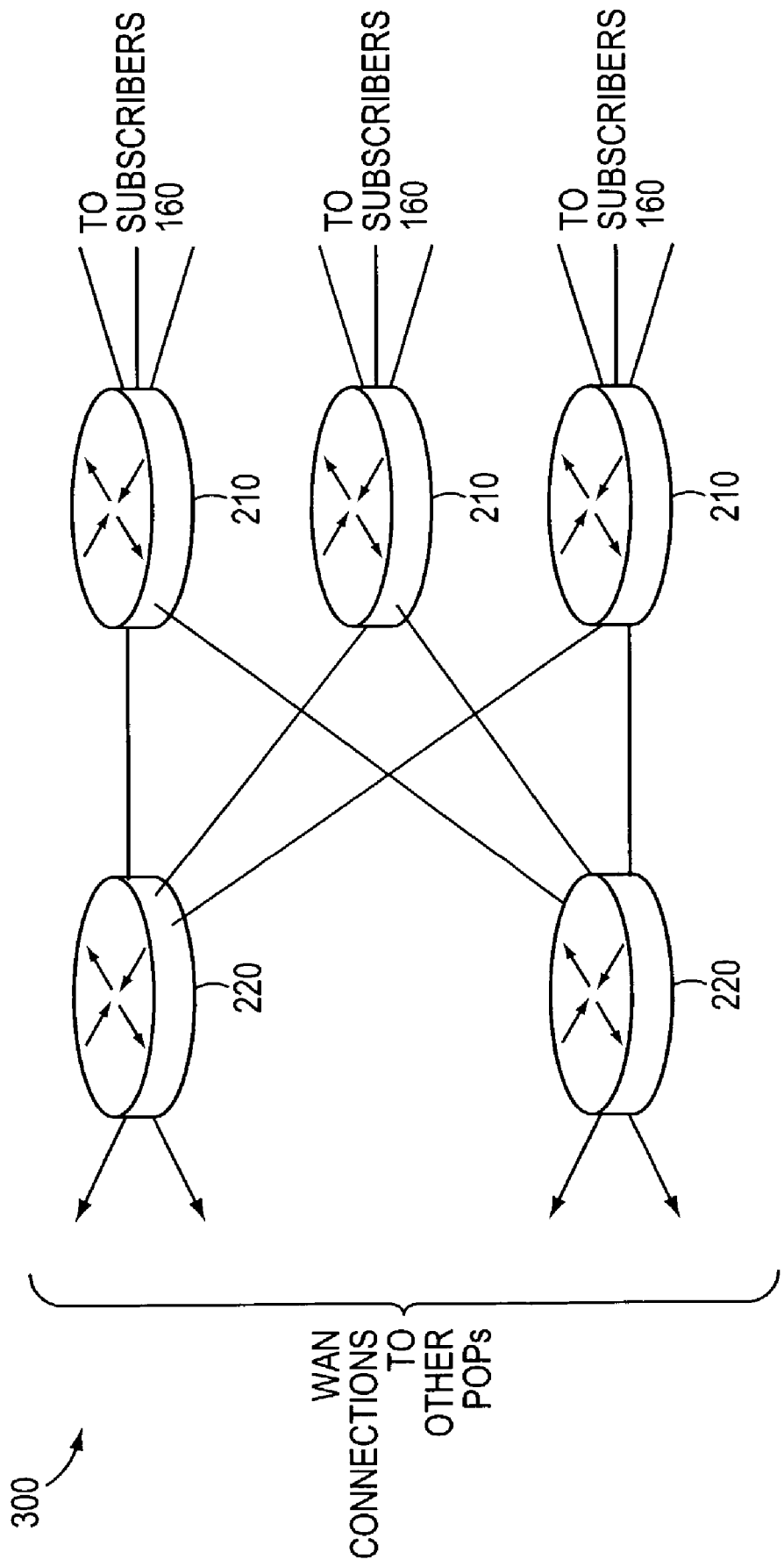
FIG. 3 is a schematic block diagram of an ISP point of presence (POP) that may be advantageously used with the present invention.

An ISP domain 200 may be further organized into points of presence (POP), each of which comprises a physical location wherein a set of access and backbone routers is located. FIG. 3 is a schematic block diagram of an illustrative embodiment of a POP 300 that may be advantageously used with the present invention. The POP 300 comprises a plurality of backbone routers 220 coupled to access routers 210 equipped with redundant trunk connections. The use of more than one backbone router enhances network availability, as does the use of redundant trunk connections on the access routers. The backbone routers 220 and access routers 210 are maintained separately so that the backbone router configuration can be kept relatively stable over time. Backbone routers are not affected when individual subscribers add or remove value-added services or when individual subscribers are added to or removed from the access routers 210. In addition, access routers can be added as new subscribers are brought onto the network.

In general, the access router 210 serves as a "front line" for an ISP 200, connecting directly to routers on the subscribers' premises. However, there is usually a complex circuit-switched infrastructure that transports, e.g., a leased-line signal a "last mile" between the subscriber premises and the POP 300. There are many ways of constructing the last-mile network; one technique for new installations is based on metropolitan-area fiber-optic ring technology. These fiber-optic network installations may be based on Synchronous Optical Network (SONET) or Synchronous Digital Hierarchy (SDH) standards. SONET/SDH technology is desirable in transport networks that provide leased line connectivity to subscriber routers because of the high capacity of fiber-optic cables and the high-density, industry-wide standard interface between network transport equipment and the equipment that uses the transported signals, such as aggregation routers.

Figure 4:
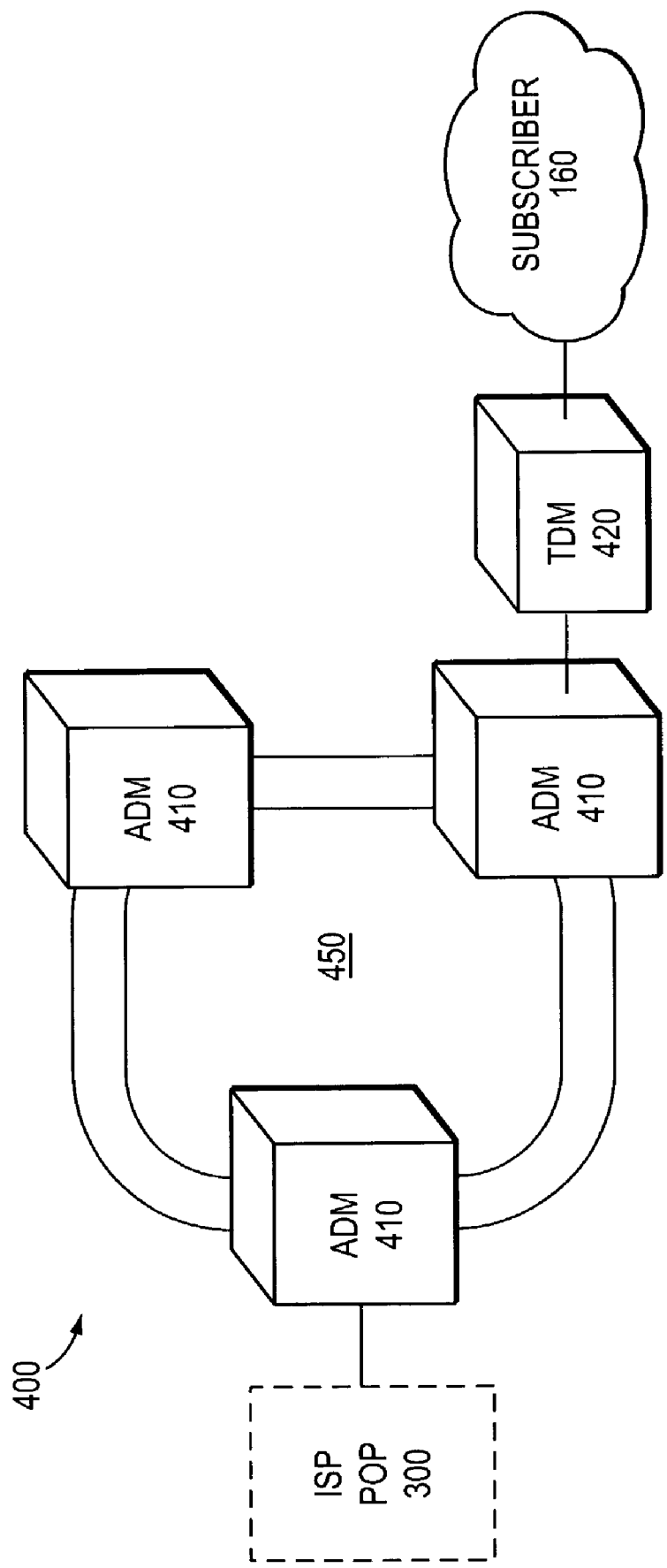
FIG. 4 is a schematic block diagram of a Synchronous Optical Network (SONET) metropolitan-area transport network that may be advantageously used with the present invention.

FIG. 4 is a schematic block diagram of a SONET metropolitan-area transport network 400 that may be advantageously used with the present invention. The SONET network 400 transports 1.544-Mbps DS1 and 44.736-Mbps DS3 signals from a subscriber site 160 across a fiber-optic ring 450 to an ISP POP 300. To that end, the SONET network 400 comprises a time-division-multiplexing (TDM) device 420 configured to multiplex a plurality of (e.g., 28) DS1 circuits to fill a DS3 circuit. In addition, the network 400 comprises a plurality of add-drop multiplexers (ADMs) 410 configured to "drop-off" either DS1 or DS3 circuits onto, e.g., an OC-12 SONET fiber.

As Internet traffic increases, the demand for access routers 210 to handle increased density, and backbone routers 220 to handle greater throughput, becomes more important. Increased density denotes a greater number of subscriber ports that can be terminated on a single access router. An aggregation router is an access router configured to accommodate increased density by aggregating a large number of leased lines from ISP subscribers onto a few trunk lines coupled to an Internet backbone. That is, the aggregator essentially functions as a large "fan-in" device wherein a plurality of relatively low-speed subscriber input links is aggregated onto at least one high-speed output trunk to a backbone network of the Internet.

Figure 5:
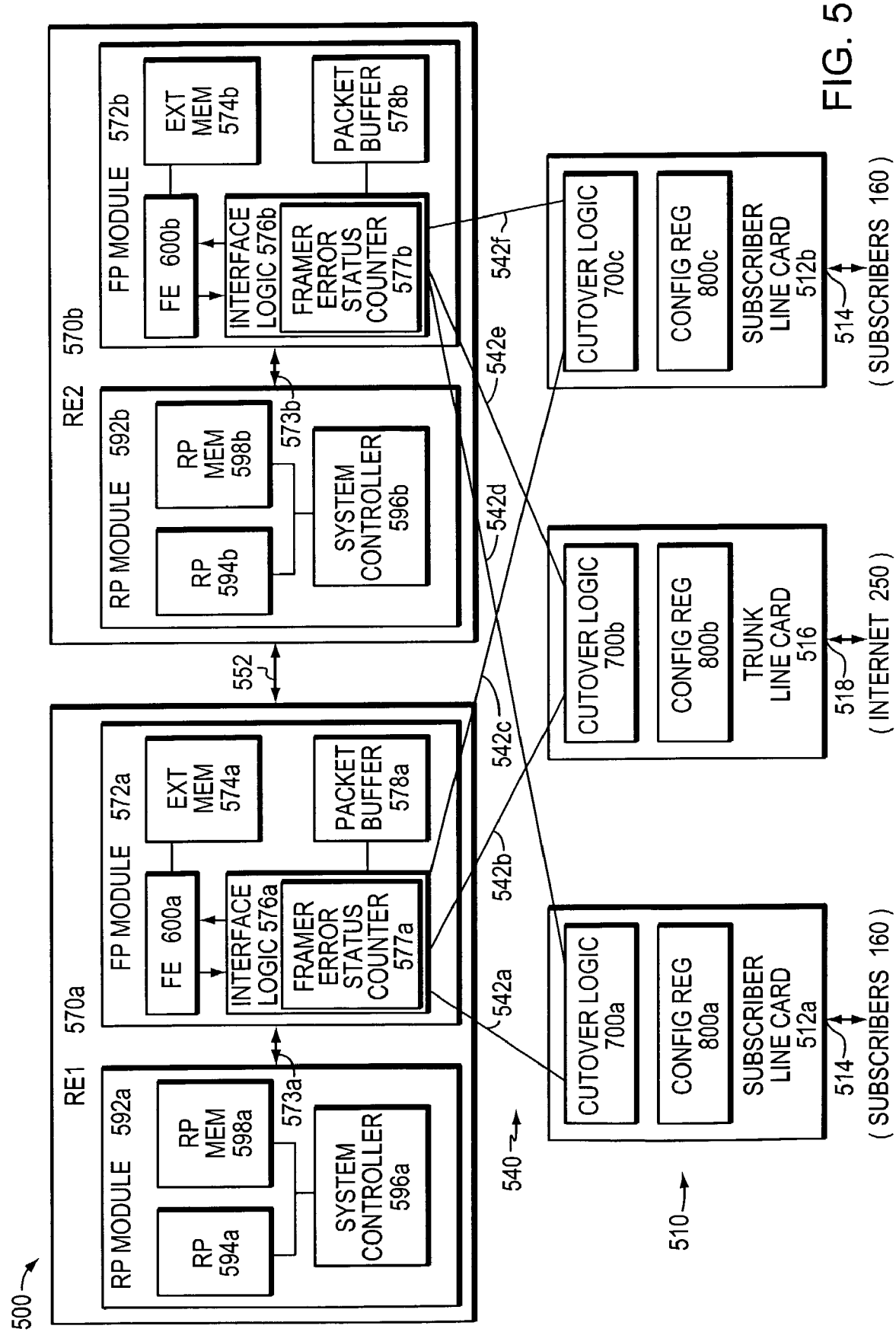
FIG. 5 is a schematic block diagram of an aggregation router that may be advantageously used with the present invention.

FIG. 5 is a schematic block diagram of an aggregation router 500 that may be used with the present invention. Aggregation router ("aggregator") 500 comprises a plurality of line cards 510 coupled to a plurality of routing engines (RE 570) via a (i.e., point-to-point) interconnect system 540. The line cards 510 include a plurality of subscriber cards 512 having ports 514 coupled to subscribers 160 and at least one trunk card 516 configured to carry subscriber data over at least one trunk port 518. The REs are coupled to each other via a bus 552 that is configured to e.g., pass "keepalive" messages and various configuration information between the REs 570.

The REs 570 provide, inter alia, quality of service (QoS) functions for complete packets received from each input line card over the interconnect system. To that end, the interconnect system 540 comprises a plurality of high-speed (i.e., point-to-point) links 542 coupling each RE to each line card 510. The links are preferably clock-forwarded links such that each link comprises a "narrow" connection of two data "wire pairs" for transporting the data signals and one clock "wire pair" for carrying clock signals. However, it will be understood to those skilled in the art that other techniques may be used including a clock forwarding technique comprising four data signals for each accompanying clock signal.

The REs 570 are configured to implement the forwarding and control planes of aggregation router 500. Each RE 570 comprises a fast packet "forwarding" processor (FP) module 572 and a route processor (RP) module 592 adapted to perform forwarding-plane and control-plane functions, respectively. The FP and RP modules are preferably interconnected in a "mezzanine" arrangement to form the RE 570. The RP module 592 is a processor-based, routing system suite comprising functionality incorporated within a typical router. That is, the RP module comprises a general-purpose processor (RP) 594, e.g., a MIPS processor, coupled to a system controller 596 and memory (RP RAM) 598. The RP 594 is configured to construct and load forwarding tables containing, e.g., layer-2 and layer-3 information, which are used by the FP module 572 to make forwarding decisions. The RP 594 also performs configuration management functions of the aggregation router 500 and communicates with neighboring peer routers and other RE 570s to exchange configuration information used to construct the forwarding tables in accordance with conventional routing algorithms. The memory 598 may comprise synchronous dynamic random access memory (SDRAM) storage locations addressable by the RP 594 for storing software programs and data structures accessed by the components. These software programs include programs that implement aspects of the inventive technique. An operating system, portions of which are typically resident in memory and executed by the processor 594, functionally organizes the router 500 by, inter alia, invoking network operations in support of software processes executing on the router 500. It will be apparent to those skilled in the art that other memory means, including various computer readable media, may be used for storing and executing program instructions pertaining to the operation of the router 500.

The FP module 572 comprises a packet buffer 578, interface logic 576, and a forwarding engine (FE) 600 coupled to an external memory (Ext Mem) 574. The external memory 574 comprises random access memory (RAM) storage locations addressable by the FE 600 for storing non-transient data organized within data structures for use in processing transient data. The non-transient data typically includes "table" data contained in e.g., layer-2 and/or layer-3 forwarding tables, statistics, access filters, encryption keys, and/or queuing information. Transient data (e.g., packet/frame data) enters and exits the engine 600 via 64-bit input and output interfaces coupled to an input buffer 610 and output buffer 680, respectively.

Figure 6:
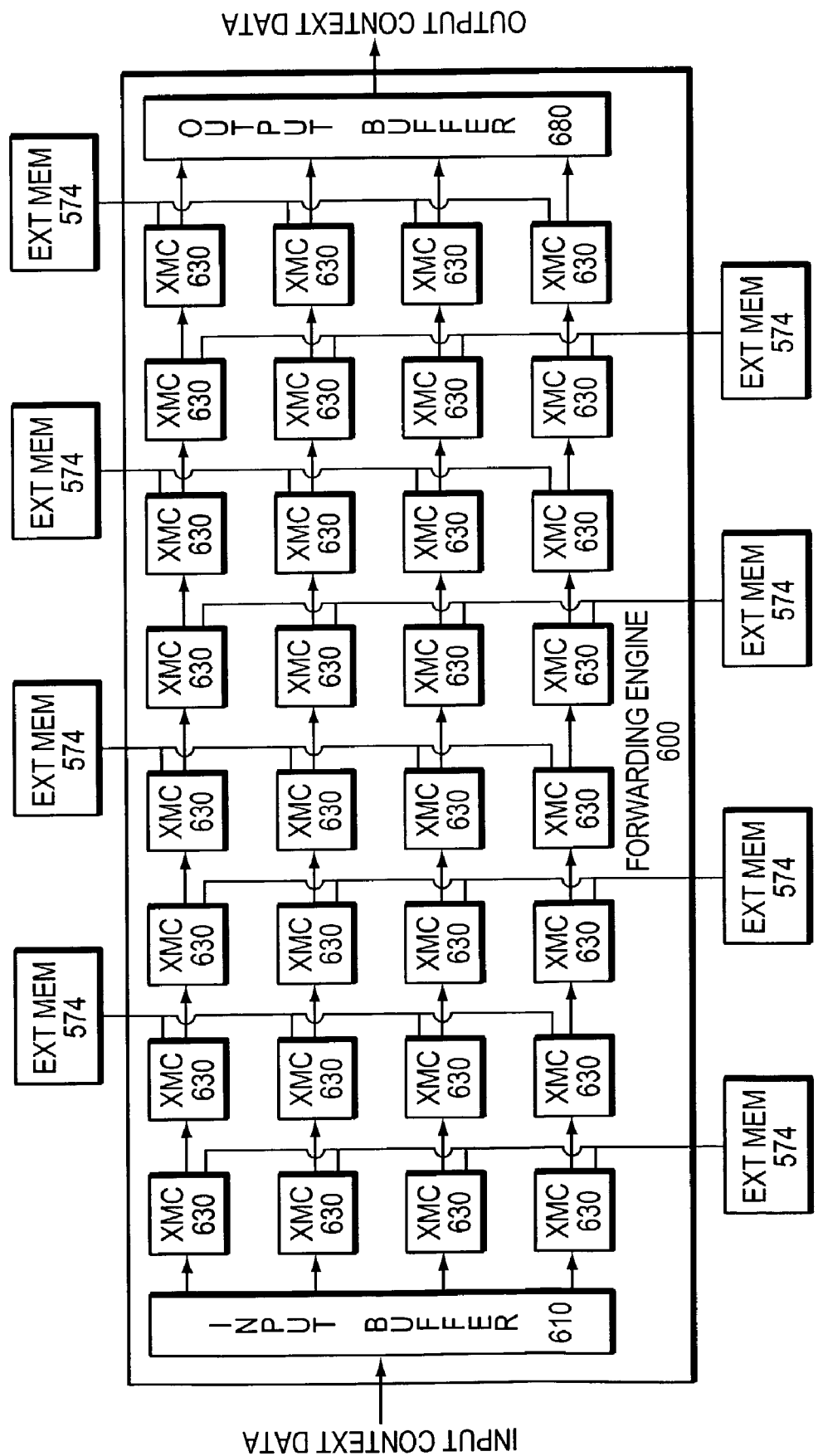
FIG. 6 is a schematic block diagram of a forwarding engine comprising a systolic array of processors coupled to an external memory that may be used with the present invention.

FE 600 may comprise a symmetric multiprocessor system having a plurality of processing elements. FIG. 6 is a schematic block diagram of FE 600 comprising an array of processing elements (XMCs) 630 embedded between input and output header buffers and coupled to external memory 574. Each processing element 630 illustratively includes a pipelined processor that contains, inter alia, a plurality of arithmetic logic units (ALUs) and a register file having a plurality of general purpose registers that store intermediate result information processed by the ALUs. The processing elements 630 may be arrayed into multiple rows and columns, and further configured as a multidimensioned systolic array. In the illustrative embodiment, the processing elements 630 are arrayed as four (4) rows and eight (8) columns in a 4×8 arrayed configuration that is embedded between an input buffer 610 and an output buffer 680. However, it should be noted that other arrangements, such as an 8×8 arrayed configuration, may be advantageously used with the present invention.

The processing elements 630 of each row are configured as stages of a "pipeline" that sequentially execute operations on the transient data loaded by the input buffer 610, whereas the processing elements 630 of each column operate in parallel to perform substantially the same operation on the transient data, but with a shifted phase. Each phase comprises a predetermined period of cycles, e.g., 128 cycles. Sequencing circuitry of the input buffer 610 controls the processing elements 630 of each pipeline by ensuring that each element 630 completes processing of current transient data before loading new transient data into the pipeline at a new phase. In general, a new phase of processing is started, i.e., a context switch is performed, when all of the elements 630 finish processing their current transient data (current context) and a new incoming transient data (new context) is completely received by the input buffer.

The RP module 592 (FIG. 5) configures the FP module 572 and sends and receives various packets that are not handled by the FP module 572. To that end, an internal bus 573 is provided that enables the RP module 592 to access (e.g., read and write) the external memory 574, as well as exchange packets with the FP module 572 through the RP memory 598.

In the illustrative embodiment, aggregator 500 includes sixteen (16) line cards 510, each of which may be configured for an OC-12, i.e., 622 megabits per second (Mbps), data rate. Thus, the point-to-point links 542 coupled to the line cards must be capable of supporting such data rates. Accordingly, an interconnect protocol is provided that enables encoding of packets over the point-to-point links 542 of the interconnect system to thereby limit the bandwidth consumed by overhead when transmitting the packets within the aggregation router. An example of an interconnect protocol that may be advantageously used with the present invention is disclosed in co-pending and commonlyowned U.S. patent application Ser. No. 09/791,062. now issued as U.S. Pat. No. 6,973,072 titled High Performance Protocol for an Interconnect' System of an Intermediate Network Node, which application is hereby incorporated by reference as though fully set forth herein.

Interface circuitry coupled to the ends of the links 542 is resident on both the line cards 510 and backplane interface logic 576 of the RE 570. The backplane interface logic 576 enables packets to be transferred from RE 570 over links 542 to the line cards 510. Specifically, backplane interface logic 576 contains logic that encapsulates and decapsulates packets into and from internal packets (described below) and transfers these internal packets over interconnect system 540 as, e.g., a byte-stream embedded in TDM frames. Moreover, interface logic 576 contains a framer error status counter 577 that tracks, e.g., clocking and framing errors detected on links 542. Preferably, logic 576 is embodied in a high performance, application specific integrated circuit (ASIC), herein-after referred to as the Cobalt ASIC, which is configured to further interface the line cards 510 to packet buffer 578 and the forwarding engine 600 of the FP module 572. An example of a backplane interface logic circuit that may be advantageously used with the present invention is disclosed in co-pending and commonly-owned U.S. patent application Ser. No. 09/791,063 titled High Performance Interface Logic Architecture of an Intermediate Network Node, which application is hereby incorporated by reference as though fully set forth herein.

The packet buffer 578 is a memory used to store packets as the forwarding engine 600 determines where and when they should be forwarded within the aggregator 500. For example, the packet buffer 578 may be used to store low-priority data packets while high-priority, low-latency packets are forwarded by the forwarding engine to an output card of the aggregator.

The interface circuitry includes interconnect ports coupled to the point-to-point links 542 of the interconnect system 540 and implements a clock forwarding technique that is configured for direct ASIC-to-ASIC transmission over a backplane of the aggregation router. As a result, the interface circuitry resident on the line cards 510 is preferably embodied within a high-performance ASIC, hereinafter referred to as the Barium ASIC, whereas the interface circuitry resident on the RE 570 is preferably embodied within the Cobalt ASIC. The interface circuitry generally functions as a translator that converts conventional formats of data received at the line cards 510 to a protocol format for transmission from, e.g., the Barium ASIC over the interconnect system 540 to the Cobalt ASIC. The ASICs also include circuitry to perform cyclic redundancy code (CRC) generation and checking on packets, along with interconnect format checking that includes checks for framing and clocking errors.

Figure 7:
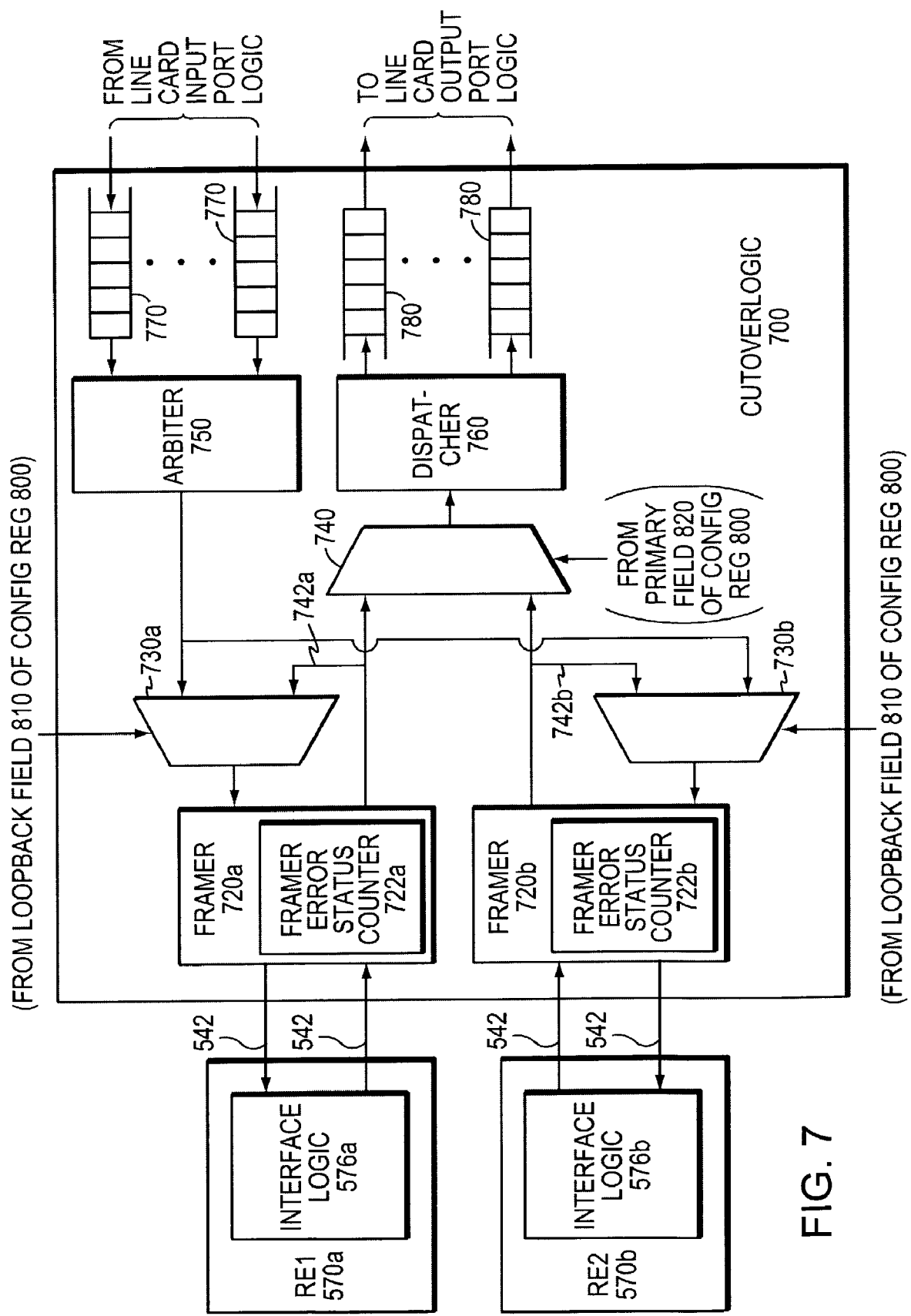
FIG. 7 is a schematic block diagram of cutover logic that may be configured to perform a loopback operation that may be advantageously used with the present invention.

The Barium ASIC contains "cutover" logic that enables data to be transferred between the line card and either RE 570. FIG. 7 is a partial schematic block diagram of cutover logic that may be advantageously used with the present invention. Logic 700 comprises a plurality of framers 720 and input selectors 730, an output selector 740, a dispatcher 760, an arbiter 750, and a plurality of input 770 and output 780 first-in-first-out (FIFO) queues. Each framer 720 is configured to communicate with a particular RE 570 over links 542. Moreover, each framer 720 is configured to assemble and disassemble frames transferred over these links 542 and contains a framer error status counter 722 that tracks, e.g., clocking and framing errors detected on these links 542. The input FIFO queues 770 hold data transferred from input port logic (not shown) contained on the line card and the output FIFO queues 780 hold data that is transferred to the line card's output port logic (not shown). The arbiter 750 removes data from the input FIFO queues 770 and passes the data through the selectors 730 to a particular framer 720 for transfer to its associated RE 570. Likewise, the dispatcher 760 places data transferred from selector 740 onto a particular output queue 780 for transfer to the line card's output port logic (not shown).

Output selector 740 selects the source of data transferred to the dispatcher 760. Specifically, selector 740 can be configured to transfer data received from either RE1 570*a* or RE2 570*b* to the dispatcher 760. Likewise, input selectors 730 select the source of data transferred to a particular RE 570. Specifically, selector 730 can be configured to transfer data to the RE 570 either from the arbiter 750 or the RE 570 itself, via a "loopback" feature 742. For example, selector 730*b* can be configured to transfer data to RE2 570*b* whose source is either the arbiter 750 or RE2 570*b*.

Figure 8:
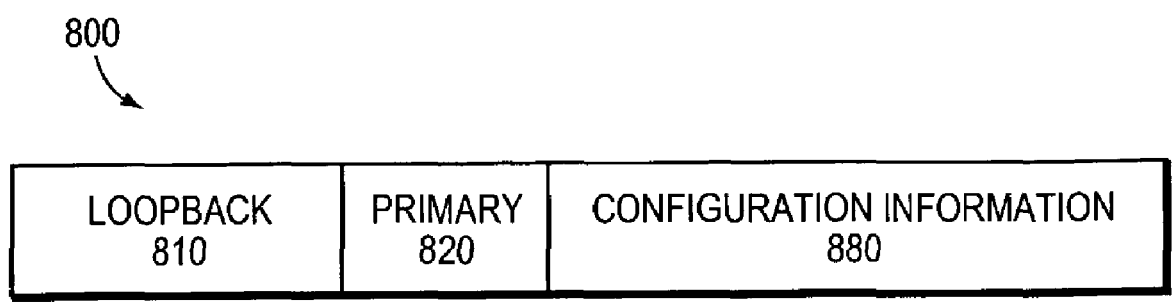
FIG. 8 is a schematic block diagram of a configuration register that may be advantageously used with the present invention.

In the illustrated embodiment, selector 730 is configured using a configuration register 800 contained on the line card 510. FIG. 8 is a schematic block diagram of a configuration register 800 that may be advantageously used with the present invention. Register 800 comprises a loopback field 810, a primary field 820, and a configuration information field 880. The configuration information field 880 holds data used to configure the Barium ASIC, such as e.g., data that specifies resetting various portions of the ASIC. The loopback field 810 is illustratively a two-bit field that specifies the source of data transferred to the RE 570. For example, one of the bits in field 810 specifies whether selector 730*b* is configured to transfer data to RE2 570*b* from either the arbiter 750 or RE2 570*b* via the loopback 742*b*.

The primary field 820 is illustratively a one-bit field that designates the "primary" (active) RE. This field 820 holds a value that generates a signal that causes selector 740 to source data from the active RE to the dispatcher 760. For example, if the primary field 820 is configured to designate RE1 570*a* as the active RE, a signal is generated that causes selector 740 to pass data sourced from RE1 570*a* to the dispatcher 760. It should be noted that the RE 570 that is not designated the primary (active) RE is considered the secondary (standby) RE.

In the illustrated embodiment, the line card 510 configures the values of the loopback 810 and primary 820 fields. Specifically, the line card 510 acquires a signal driven on a bus (not shown) that designates which RE 570 is the active RE and uses the value of this signal to configure the primary 820 and loopback 810 fields. For example, assume RE1 570*a* is the active RE and it drives a signal on the bus to indicate it is the active RE. A line card 510 acquires (e.g., reads) this signal, determines RE1 570*a* is the active RE and configures the primary field 820 to cause selector 740 to pass packets received from RE1 570*a* to the dispatcher 760. Likewise, since RE1 570*a* is the active RE, the line card concludes that RE2 570*b* is the standby RE and configures the loopback field 810 to cause selector 730*b* to loop packets received from RE2 570*b* back to RE2 570*b*.

Figure 9:
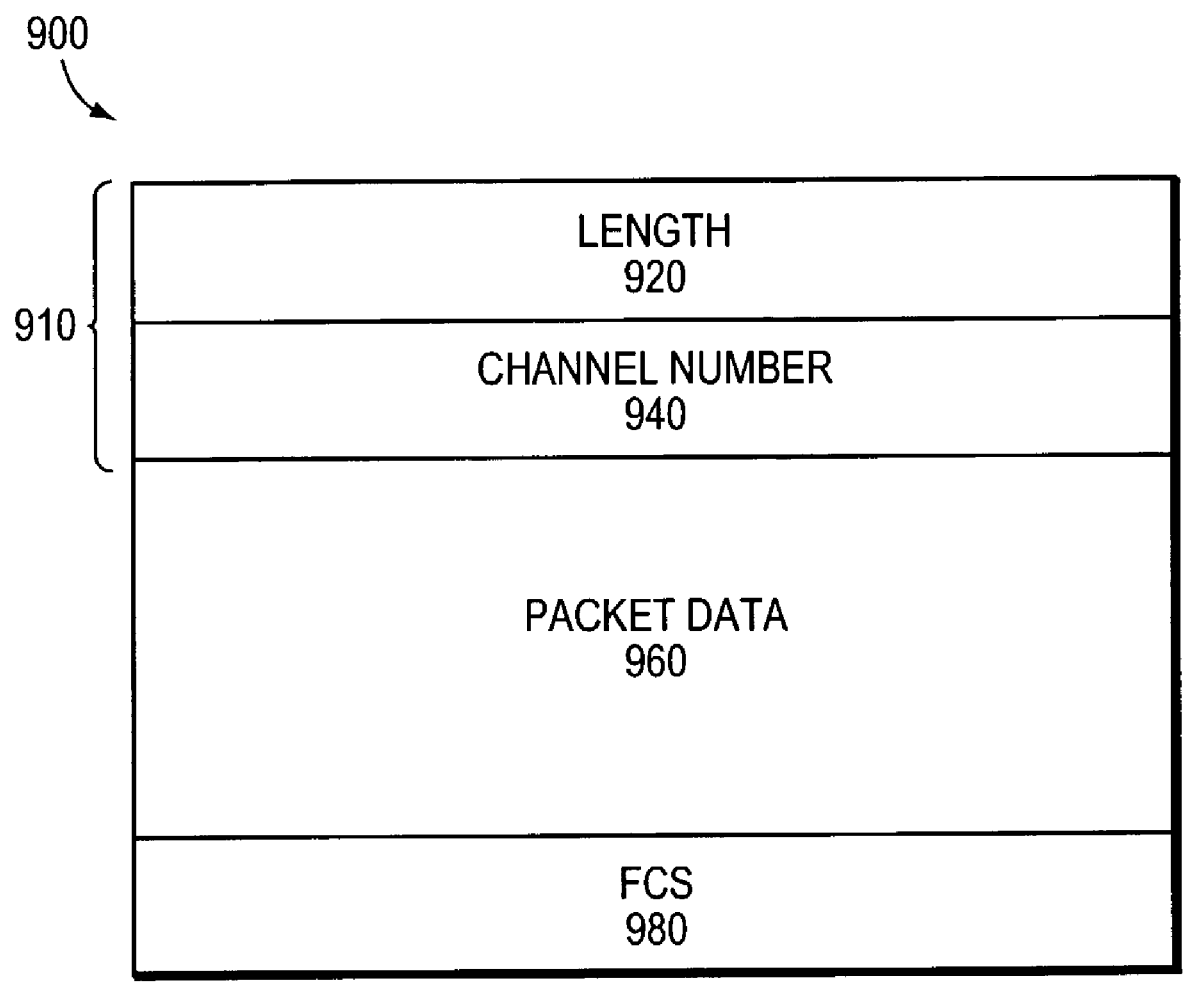
FIG. 9 is a schematic block diagram of an internal frame that may be advantageously used with the present invention.

As noted, packet data is transferred over the point-to-point links 542 as internal packets that are carried preferably as a byte-stream embedded in TDM frames. FIG. 9 is a schematic block diagram of an internal packet that may be advantageously used with the present invention. Internal packet 900 comprises an internal header 910, a packet data field 960, and a frame check sequence (FCS) field 980. The packet data field 960 holds the packet data and the FCS field 980 holds a checksum of the internal header 910 and packet data 960 fields of the encapsulated packet 900. The internal header 910 comprises a length field 920, and a channel number field 940. The length field 920 holds a value that specifies the size of the packet contained in the packet data field 960, preferably in bytes. The channel number field 940 holds an identifier that identifies a channel, which e.g., maps to a port on the line card 510. For packets transferred from the RE 570 to the line card 510 the contents of this field 940 identifies the channel on which the packet is to be sent. Likewise, for packets transferred from the line card 510 to the RE 570, the contents of field 940 identifies the channel on which the packet was received. For test packets, as will be described below, the channel number holds a unique identifier that indicates that the packet data field 960 contains a test packet. The dispatcher 760 is configured to, inter alia, examine the channel number field 940 for each packet received and drop the packet 900 if it contains an identifier indicating a test packet.

In the illustrated embodiment, aggregation router 500 is configured to operate in a redundant manner wherein one RE operates as the active RE and the other redundant RE operates as the standby RE. In this arrangement, the active RE primarily handles live traffic whereas the standby RE, inter alia, verifies the operational state of elements contained in its control plane and forwarding plane in accordance with the inventive technique. Specifically, the standby RE is configured to execute operational software and use operational hardware and configuration information, such as layer-2 (L2) and layer-3 (L3) information acquired from the active RE, to verify its elements. Operational software and hardware in this context means the software and hardware that the RE would use if it were to be an active RE. Verification of the control and forwarding plane elements is achieved by (i) generating packets, (ii) transferring the packets to the forwarding plane, (iii) forwarding the packets from the forwarding plane to the line cards, (iv) looping the packets back from the line cards to the forwarding plane, (v) forwarding the packets from the forwarding plane to the control plane, and (vi) verifying the packets.

Figure 10:
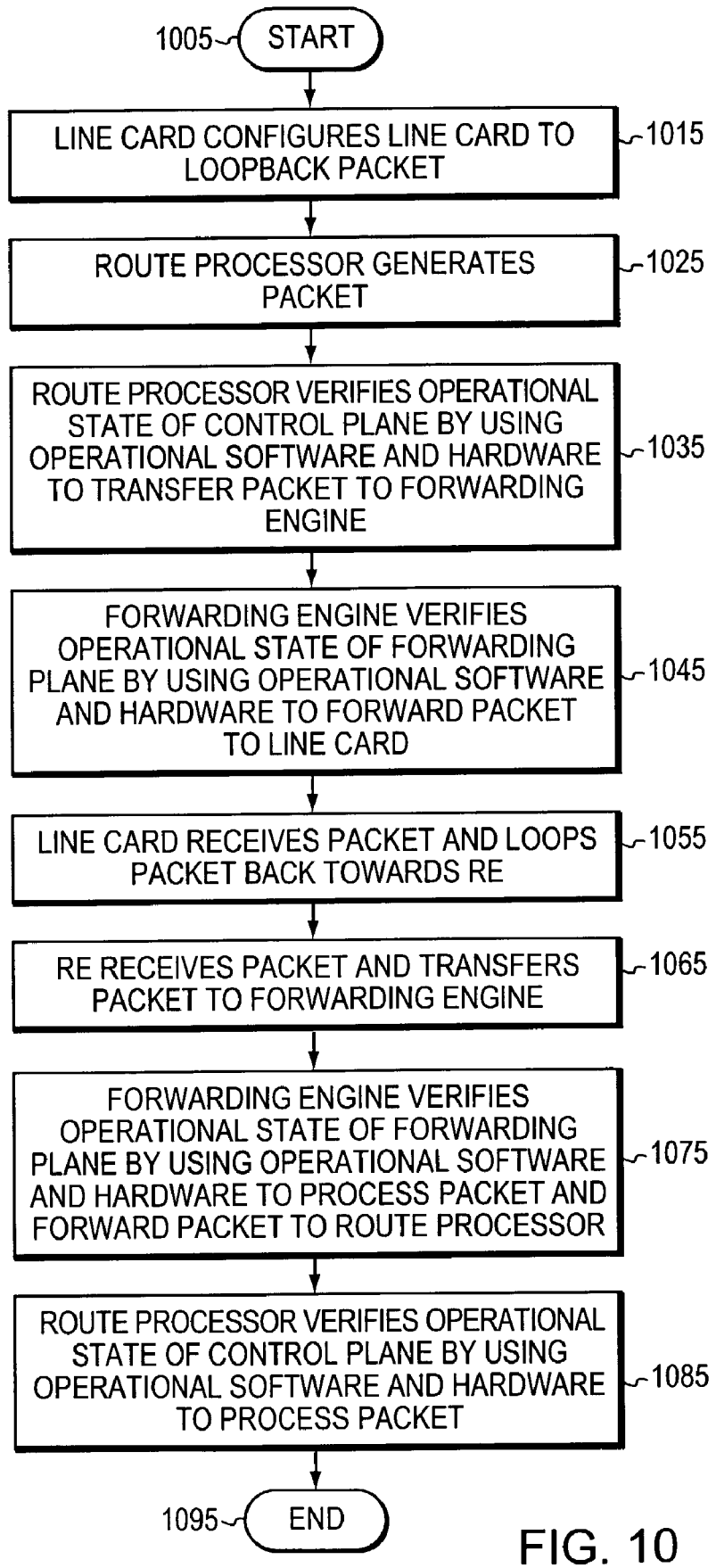
FIG. 10 is a flow diagram of a sequence of steps that may be advantageously used to verify an intermediate node, comprising a control and forwarding plane, in accordance with the inventive technique.

Assume for illustrative purposes that RE2 570*b* is configured as a standby RE. FIG. 10 is a flow diagram of a sequence of steps that may be used to verify the control and forwarding plane elements of RE2 570*b* in accordance with the inventive technique. The sequence begins at Step 1005 and proceeds to Step 1015 where one or more of the line cards 510 configure register 800 to loop packets received from RE2 570*b* back to RE2 570*b*. Specifically, the line card 510 places a value in field 810 of its configuration register 800 that configures selector 730*b* to select packets received by the line card 510 from RE2 570*b* for "loopback" to RE2 570*b*.

At Step 1025, RP 594*b* then generates a test packet preferably containing information that causes forwarding engine 600*b* to forward the packet to a specific (target) line card 510 and back to RP 594*b* when the packet is received (looped back) from the target line card 510, as described below. Moreover, RP 594 generates and attaches header 910 to the test packet including placing an identifier in the channel number field 940 to indicate that the packet data 960 contains a test packet. RP 594 then verifies the operational state of the control plane by using operational software and hardware to transfer the packet over bus 573*b* to forwarding engine 600*b*, as indicated at Step 1035.

Next, at Step 1045, forwarding engine 600*b* verifies the operational state of the forwarding plane by using operational software and hardware to process the packet including forwarding the packet to the target line card 510. Specifically, forwarding engine 600*b* applies the packet to its forwarding tables and identifies the destination (i.e., target line card 510) that is to receive the packet and transfers the packet to interface logic 576*b*. Interface logic 576*b*, in turn, calculates a frame check sequence (FCS) and appends it to the packet to create an internal packet 900 and transfers the internal packet 900 over interconnect system 540 to the target line card 510.

At Step 1055, the target line card 510 receives the internal packet 900 at framer 720*b* and applies the packet 900 to selector 730*b*, which passes (loops) the internal packet 900 back to the framer 720*b*. Framer 720*b* then transfers the internal packet 900 over interconnect system 540 back to RE2 570*b*. At Step 1065, interface logic 576*b* receives the internal packet 900, verifies the packet 900 using its FCS 980, removes the FCS field from the packet, and transfers the packet to the forwarding engine 600*b*.

Next at Step 1075, the FE 600*b* verifies the operational state of the forwarding plane using operational software and hardware to process the packet including e.g., examining the packet to determine its destination, e.g., RP 594*b*, and forwarding the packet over bus 573*b* to this destination. At Step 1085, the RP 594*b* verifies the operational state of the control plane by using operational software and hardware to process the packet including verifying the test packet. The test packet verification may include examining the contents of the looped-back test packet to ensure it matches the contents of the (original) test packet, and/or examining status associated with the test packet, such as the framer error status counters 722 and 577 kept by e.g., the framers 720 and interface logic 576, respectively, to determine if any framing and/or clocking errors were detected. The sequence ends at Step 1095.

Figure 11:
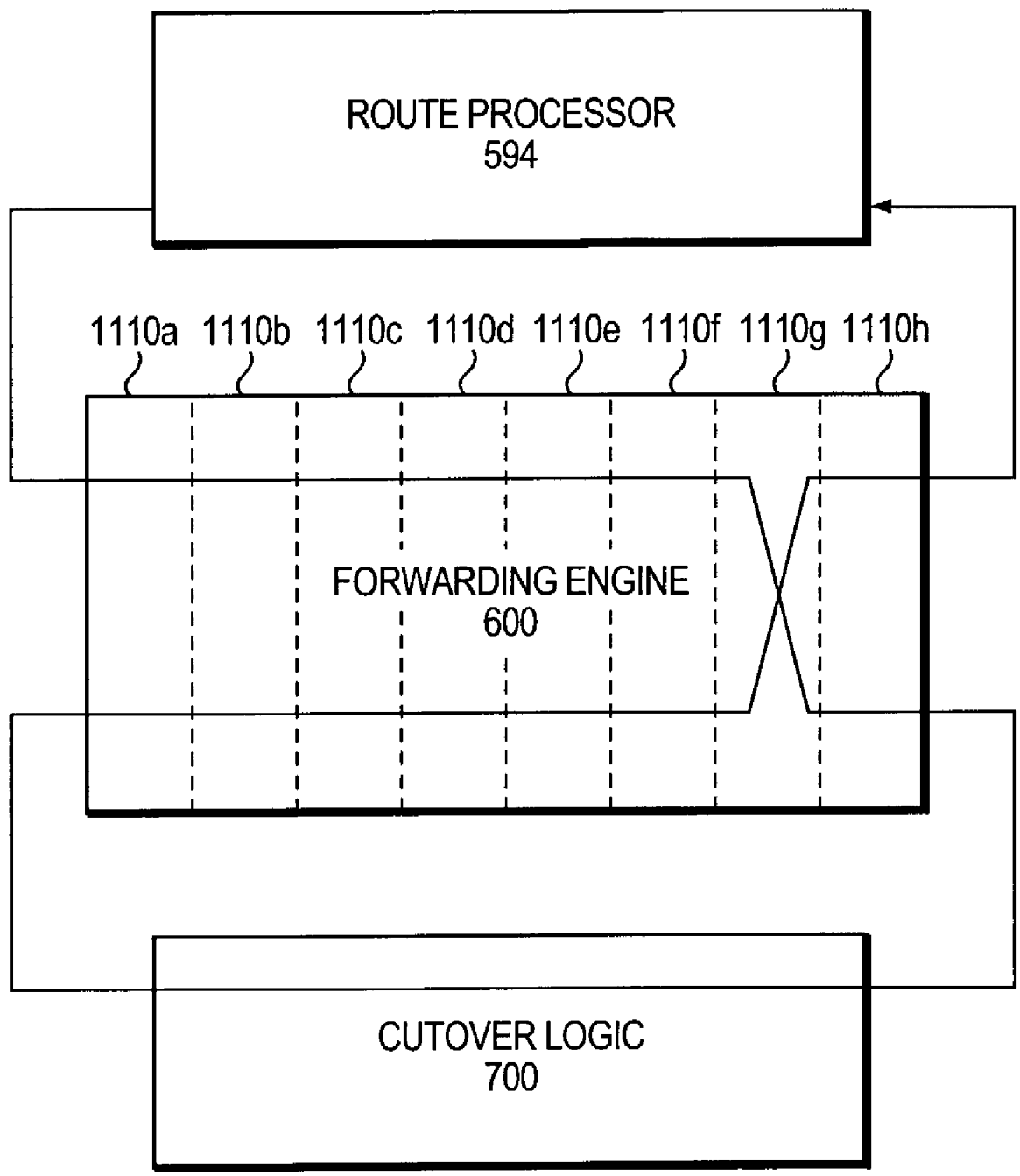
FIG. 11 is a schematic block diagram that illustrates the data flow of a packet in accordance with the inventive technique.

FIG. 11 is a high-level schematic block diagram that illustrates the flow of the test packet through router 500. The packet is generated and transferred from the RP 594 to the forwarding engine 600 where it is further processed. Blocks 1110*a*-1110*h* represent various stages of the forwarding engine's 600 pipeline. Specifically, the packet enters the pipeline at stage 1110*a*. At stage 1110*g*, the forwarding engine 600 determines (e.g., by using its forwarding table) that the test packet is destined for line card 510 and at stage 1110*h* forwards the packet towards card 510. The line card 510 receives the packet at cutover logic 700 and loops it back towards the RE. The packet is received by the RE and transferred to the forwarding engine where it enters the forwarding engine's 600 pipeline at stage 1110*a*. At stage 1110*g*, the forwarding engine 600 determines (e.g., by examining the packet) that the packet is destined for the RP 594 and at stage 1110*h* forwards the packet to the RP 594 where it is then processed.

It should be noted that in the illustrated embodiment of the invention the redundant (i.e., standby) RE operates using operational software and hardware. The operational software includes routines that test the standby RE in accordance with the inventive technique. The standby RE also utilizes non-transient data (configuration data) acquired from the active RE. This data may include a copy of the active RE's forwarding tables, as well as other configuration information used by the active RE. By using operational software and configuration information, the standby RE is able to verify functions of various elements that would be in use if these elements were to operate as active elements (i.e., elements in an active RE). For example, the operational software may be involved in forwarding decisions made by the RE when it is active. By using the operational software in the standby RE to make forwarding decisions, elements used by the active RE to make forwarding decisions are verified by the standby RE. Likewise, configuring the standby RE to use operational software and configuration information enhances system availability by lessening the loss of service that may be experienced in the event of a switchover operation. For example, since the standby RE is already loaded with operational software and to some degree operational configuration information, the time it takes to bring the standby RE to a state that would allow it to take over as an active RE would likely be less than if the operational software and configuration information had to be loaded from scratch. Thus, a system, such as the system described above, where the standby RE is configured with operational software and configuration information would likely incur less loss of service and have increased availability over a system that does not.

In the illustrated embodiment above, internal packets containing test packets designate an identifier in the channel number field 940 that indicates the internal packet contains a test packet in the packet data field 960. Moreover, the dispatcher logic 760 is configured to recognize this channel identifier and drop packets containing this identifier. This prevents test packets from being inadvertently transferred by the line card to e.g., an output port and guards against interfering with the operation of the active elements of the system.

Also in the illustrated embodiment, test packets are generated and verified by the control plane; however, this is not intended to be a limitation of the invention. Rather in other embodiments, packets are generated and verified outside the control plane. For example, in one embodiment of the invention, packet verification is performed visually by an operator. In another embodiment of the invention, the looped-back test packet is forwarded towards another entity, such as another (remote) node on the network, which verifies the packet. Also, in another embodiment, packets are generated outside the system and injected into the forwarding plane.

Also the illustrated embodiment is described as containing one active forwarding plane and one optional active control plane, however, this is not intended to be a limitation of the invention. Other embodiments that comprise more than one active forwarding planes and/or more than one active control planes can take advantage of the invention.

In summary, the present invention relates to a technique for verifying the elements that make up redundant control and forwarding planes of an intermediate node. According to the inventive technique, a test packet is generated and transferred to the redundant forwarding plane where the packet is forwarded towards a line card. The line card receives the packet and loops it back towards the redundant forwarding plane. The redundant forwarding plane forwards the looped-back packet towards a destination where it is processed.

The foregoing description has been directed to specific embodiments of this invention. It will be apparent that other variations and modifications may be made to the described embodiments, with the attainment of some or all of their advantages. Therefore, it is an object of the appended claims to cover all such variations and modifications as come within the true spirit and scope of the invention.

What is claimed is:

1. In an intermediate node comprising one or more active forwarding planes and one or more redundant forwarding planes coupled to one or more target line cards, a method for verifying the intermediate node comprising:
   generating a test packet;
   transferring the test packet to a redundant forwarding plane;
   verifying the operational state of the redundant forwarding plane by using operational software and hardware contained in the redundant forwarding plane to forward the test packet from the redundant forwarding plane to a target line card; and
   looping the test packet back from the target line card to the redundant forwarding plane;
   wherein the intermediate node comprises one or more active control planes and one or more redundant control planes.

2. A method as defined in claim 1 comprising the step of: verifying the operational state of a redundant control plane by using operational software and hardware contained in the redundant control plane to transfer the test packet from the redundant control plane to the redundant forwarding plane.

3. A method as defined in claim 1 comprising the step of: verifying the operational state of the redundant forwarding plane by using operational software and hardware contained in the redundant forwarding plane to forward the looped-back test packet from the redundant forwarding plane to a destination.

4. A method as defined in claim 3 wherein the destination is a redundant control plane.

5. A method as defined in claim 4 comprising the step of: verifying the operational state of a redundant control plane by using operational software and hardware contained in the redundant control plane to process the looped-back test packet.

6. A method as defined in claim 5 comprising the step of: examining status associated with the test packet.

7. A method as defined in claim 5 comprising the step of: examining the contents of the looped-back test packet to ensure it matches the contents of the test packet.

8. A method as defined in claim 5 comprising the steps of: examining a framer error status associated with the test packet to determine if any framing errors were detected.

9. A method as defined in claim 5 comprising the steps of: examining a framer error status associated with the test packet to determine if any clocking errors were detected.

10. A method as defined in claim 1 wherein the step of verifying includes the steps of:
    acquiring configuration information from an active control plane;
    applying the test packet to the configuration information to determine the target line card; and
    forwarding the packet to the target line card.

11. A method as defined in claim 1 comprising the step of: configuring the target line card to loop back the test packet.

12. A method as defined in claim 1 wherein the test packet is encapsulated in an internal packet.

13. A method as defined in claim 12 wherein the internal packet contains an identifier that indicates the internal packet contains the test packet.

14. In an intermediate node comprising one or more active forwarding planes and one or more redundant forwarding planes coupled to one or more target line cards, a method for verifying the intermediate node comprising:
    generating a test packet,
    transferring the test packet to a redundant forwarding planet;
    verifying the operational state of the redundant forwarding plane by using operational software and hardware contained in the redundant forwarding plane to encapsulating the test packet in an internal packet that contains an identifier that indicates the internal packet contains the test packet, and forwarding the internal packet from the redundant forwarding plane to a target line card; and
    looping the internal packet back from the target line card to the redundant forwarding warding plane;
    examining the identifier to determine if it indicates the internal packet contains a test packet; and if the internal packet contains a test packet, dropping the internal packet.

15. A method as defined in claim 14 wherein the internal packet contains a frame check sequence (FCS).

16. A method as defined in claim 15 comprising the step of:
verifying the internal packet using the frame check sequence (FCS).

17. A system comprising:
a redundant control plane configured to verify the operational state of the redundant control plane by generating a test packet and using operational software and hardware contained in the redundant control plane to transfer the test packet to a redundant forwarding plane;
the redundant forwarding plane configured to verify the operational state of the redundant forwarding plane by using operational software and hardware contained in the redundant forwarding plane to forward the test packet to a line card; and
the line card configured to loop the test packet back to the redundant forwarding plane.

18. A system as defined in claim 17 wherein the redundant forwarding plane is configured to verify the operational state of the redundant forwarding plane by using the forwarding plane's operational software and hardware to forward the looped-back test packet to a destination.

19. A system as defined in claim 17 wherein the line card is configured to loop back the test packet.

20. A system as defined in claim 17 wherein the line card comprises:
a dispatcher configured to drop the test packet.

21. An apparatus comprising:
means for generating a test packet;
means for verifying the operational state of a redundant control plane by using operational software and hardware contained in the redundant control plane to transfer the test packet from the redundant control plane to a redundant forwarding plane;
means for verifying the operational state of the redundant forwarding plane by using operational software and hardware contained in the redundant forwarding plane to forward the test packet from the redundant forwarding plane to a target line card; and
means for looping the test packet back from the target line card to the redundant forwarding plane.

22. A computer readable medium comprising computer executable instructions for execution in a processor for:
generating a test packet;
transferring the test packet to a redundant forwarding plane;
verifying the operational state of the redundant forwarding plane by using operational software and hardware contained in the redundant forwarding plane to forward the test packet from the redundant forwarding plane to a target line card; and
verifying the operational state of a redundant control plane by using operational software and hardware contained in the redundant control plane to process a looped-back test packet.

23. A computer readable medium as defined in claim 22 comprising computer executable instructions for execution in a processor for:
examining the contents of the looped-back test packet to ensure it matches the contents of the test packet.

24. A computer readable medium as defined in claim 22 comprising computer executable instructions for execution in a processor for:
examining status associated with the test packet.

* * * * *